Dec. 17, 1929.  E. F. HARDT  1,739,793
TOOL BOX
Filed Sept. 24, 1928
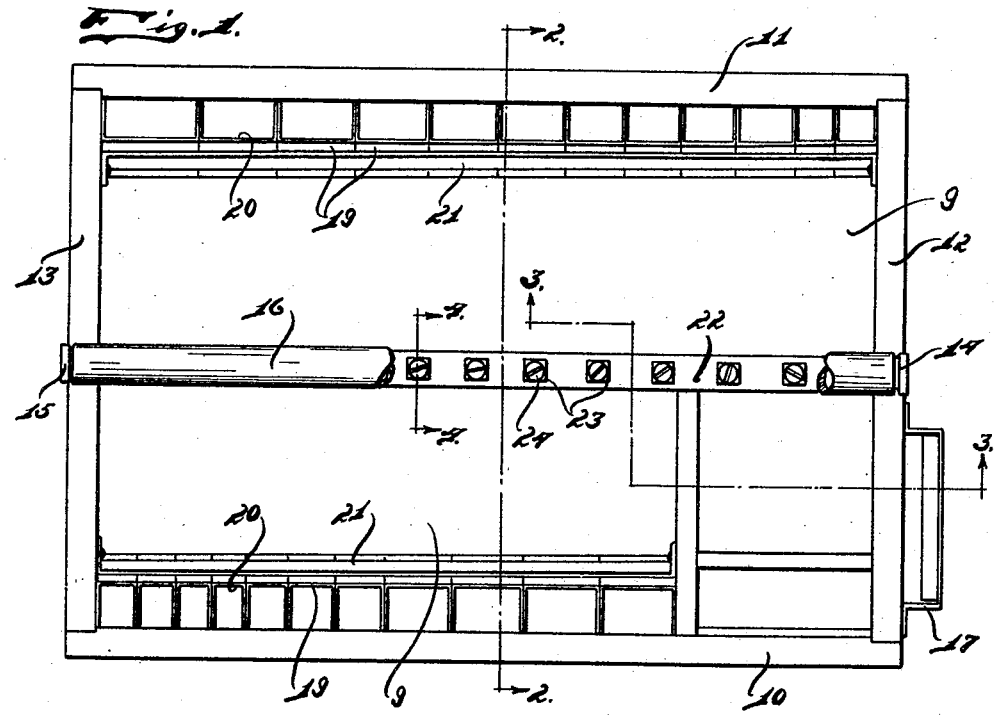
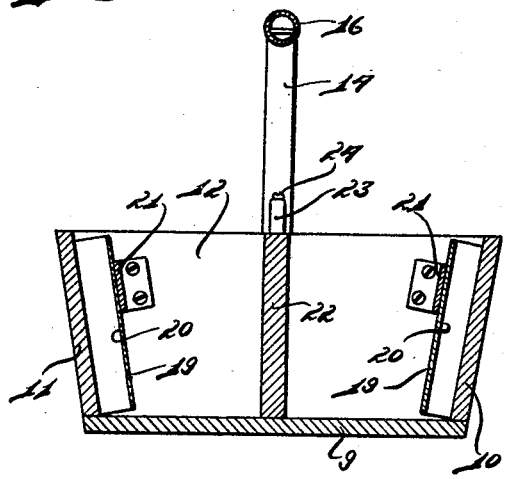
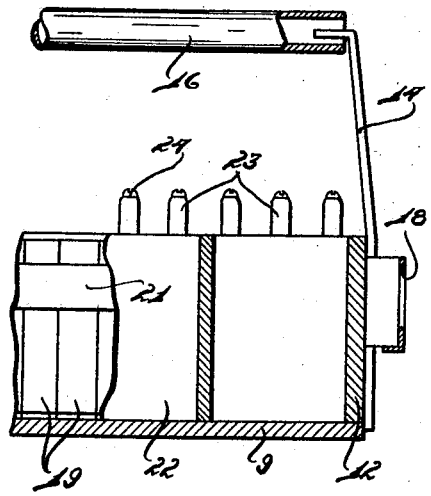
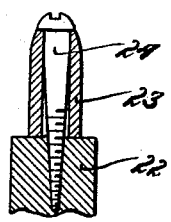
INVENTOR.
Emil F. Hardt.
BY
ATTORNEY.

Patented Dec. 17, 1929

1,739,793

UNITED STATES PATENT OFFICE

EMIL F. HARDT, OF DETROIT, MICHIGAN

TOOL BOX

Application filed September 24, 1928. Serial No. 308,114.

My invention relates to a new and useful improvement in tool boxes, whereby tools of various kinds may be easily and quickly transported from place to place, the box lending itself particularly for use in the shop in which the tools are being used.

It is an object of the present invention to provide a tool box of this class which will be simple in structure, economical of manufacture, and highly efficient in use.

Another object of the invention is the provision in a tool box of this class of a plurality of compartment forming members mounted at opposite sides of the box and formed from strips of metal which may be economically and easily shaped into desired form.

Another object of the invention is the provision of a tool box of this class having a plurality of tool engaging members projecting upwardly having centrally arranged support.

Other objects will appear hereinafter.

The invention consists in the combination and arrangement of parts hereinafter described and claimed.

The invention will be best understood by a reference to the accompanying drawings which form a part of this specification and in which, Fig. 1 is a top plan view of the invention with a part of the handle broken away.

Fig. 2 is a sectional view taken on line 2—2 of Fig. 1.

Fig. 3 is a fragmentary sectional view taken on line 3—3 of Fig. 1.

Fig. 4 is a fragmentary sectional view taken on line 4—4 of Fig. 1.

The invention comprises a box-like structure having a base 9 and inclined side-walls 10 and 11, and end walls 12 and 13 projected vertically to the base 9. Secured to the end walls 12 and 13 are handle supporting strips 14 and 15 respectively, each having its upper end angularly turned and engaging in a tubular handle 16 which may be formed from pipe or the like. Mounted on the end wall 12 is a receptacle 17 having formed in its outer wall, an opening 18, the receptacle serving as a means for carrying rules, gages, etc. Positioned in engagement with the walls 10 and 11 and extending from the base 9 to substantially the upper edge of these walls 10 and 11, are a plurality of U-shaped metallic members which serve, when the legs thereof are projected inwardly toward the walls, to form compartments 20, in which various tools such as drills, reamers, etc., may be carried. Secured at its angularly turned ends, to the end walls 12 and 13, are retaining strips 21 which serve to bind the members 19 in engagement with their respective walls. Extending longitudinally of the base 9 and projecting upwardly therefrom preferably centrally thereof, is a partition 22. Mounted in this partition 22 are wooden supports 23 through each of which is projected a screw 24 fastening the supports 23 on the upper face of the partition 22. The supports 23 serve as suitable carrying members for drills, shanks or other hollow members.

With a tool box constructed in this manner a means is provided for carrying in the tool box a large number of smaller tools, leaving the main body of the box for the reception of larger tools. The use of the box has proven that it is quite efficient and serves as a considerable labor and time saver when used.

While I have illustrated and described the preferred form of construction, I do not wish to limit myself to the precise details of structure shown, but desire to avail myself of such variations and modifications as come within scope of the appended claim.

Having thus described my invention what I claim as new and desire to secure by Letters Patent is:—

A tool box of the class described comprising a base; end walls projecting upwardly from said base; side walls projecting upwardly from opposite sides of said base at an inclination thereto; a plurality of U-shaped members engaging at the ends of their legs the inner surface of said side walls; a bar; angularly turned portions on opposite ends of said bar secured to the inner surface of said end walls, the main body of said bar engaging the bights of said U-shaped members and preventing disengagement of said U-shaped members from said side walls.

In testimony whereof I have signed the foregoing specification.

EMIL F. HARDT.